United States Patent Office 3,634,255
Patented Jan. 11, 1972

---

3,634,255
NOVEL FLUOROCARBON COMPOSITION
Kevin Paul Murphy, Bernardsville, and Sabatino Robert
Orfeo, Morris Plains, N.J., assignors to Allied Chemical
Corporation, New York, N.Y.
No Drawing. Filed Oct. 3, 1968, Ser. No. 764,928
Int. Cl. C09k 3/02
U.S. Cl. 252—67                                          8 Claims

ABSTRACT OF THE DISCLOSURE

Dichlorodifluoromethane ($CCl_2F_2$) and monochlorofluoromethane ($CH_2ClF$), in certain proportions, form an azeotrope and essentially azeotropic mixtures, which are constant boiling, or essentially constant boiling, and which mixtures possess refrigeration capacities higher than either of the $CCl_2F_2$ and $CH_2ClF$ components alone, with only a small increase in pressure. These mixtures are specially adapted for use in systems having high condensing temperatures such as automobile air conditioning systems.

BACKGROUND OF THE INVENTION

The lower aliphatic hydrocarbons, when substituted by fluorine and chlorine, are well-known to have potential as refrigerants. Many of these halocarbon materials exhibit certain desired properties for refrigerant purposes including low cost, low specific volume, low toxicity and non-flammability which characteristics have resulted in the extensive use of such compounds in a large number of refrigeration applications. Examples of such compounds include dichlorodifluoromethane ($CCl_2F_2$), B.P. $-21.6°$ F.; chlorodifluoromethane ($CHClF_2$), B.P. $-41.4°$ F.; fluorodichloromethane ($CHCl_2F$), B.P. $48.1°$ F.; fluorotrichloromethane ($CCl_3F$), B.P. $78.4°$ F. and tetrafluorodichloroethane ($CClF_2CClF_2$), B.P. $38.4°$ F.

A large number of refrigerants of different boiling temperatures and capacities are required to permit flexibility of design and the art is continually faced with the problem of providing new refrigerants as the need arises for new capacities and types of installations.

It is well-known that refrigeration capacity is largely a function of the vapor pressure of the refrigerant at the evaporating temperature. Accordingly it would be logical in seeking refrigerants possessing higher capacities to study those exhibiting higher vapor pressures. The use of higher pressure refrigerants, however, requires the use of heavier and more costly equipment components to maintain the desired safety margins. Any refrigerant composition which could produce an increase in capacity without a corresponding increase in operating pressures, while possessing other desirable refrigeration properties, would be highly valuable to the industry.

There obviously is only a limited number of halocarbon compounds which, individually, could be used as refrigerants. It is known in the art to resort to the use of mixtures of halocarbon compounds to achieve compromise properties between the properties of the components thereof. In this way, some tailoring to the needs of a particular refrigeration installation design can be achieved. Since ordinary mixtures result in compromised properties, however, it is not possible to reach higher levels of capacities with such mixtures. Moreover, the use of ordinary mixtures entails a number of operating disadvantages, not the least of which is the fact that such mixtures can fractionate during the refrigeration cycle with consequent reduction of evaporator pressure and loss of efficiency. The tendency to fractionate also makes handling and reclamation of the refrigerant mixtures difficult. On the other hand, mixtures of halocarbons which are azeotropic, that is to say the vapor composition of which is the same or essentially the same as the liquid composition in which it is in equilibrium, are not subject to fractionation during the refrigeration cycle or upon handling as is the case with ordinary mixtures.

The advantages of an azeotropic mixture as compared with a non-azeotropic mixture are well-known to those skilled in the art. Unfortunately, however, as is also well-known in the art, as evidenced by the disclosure in U.S.P. 3,085,065 to Kvalnes, there has not as yet been found by anyone a basis for the predictability of the formation of azeotropes between fluorocarbon compounds. Specifically, it has not been found that closeness in structure of one halocarbon compound to another which forms an azeotrope with another given halocarbon material is of any aid in predicting the formation of an azeotrope. There are literally thousands of possible combinations of halocarbon compounds, which comprise mixtures having advantageous additive refrigeration properties but which are not azeotropic in nature.

An object of this invention is to provide a novel halocarbon azeotropic system comprising an azeotropic mixture and a range of essentially azeotropic mixtures which afford a new capacity level not known to be available from a single halocarbon refrigerant compound. Another object of the invention is to provide a range of refrigerant mixtures which possess significantly higher capacity levels than $CCl_2F_2$ but which can be used in refrigeration systems with no significantly higher operating pressures than would be required for $CCl_2F_2$ alone.

Still another object of the invention is to provide novel refrigerant mixtures particularly suited for use in centrifugal refrigeration systems and in systems having high condensing temperatures such as automobile air conditioning systems.

Yet another object of the invention is to provide novel refrigerant mixtures in which flammability is reduced to substantially negligible proportions.

Other objects and advantages of the invention will become apparent from the following description.

SUMMARY OF THE INVENTION

In accordance with the invention, it has been discovered that dichlorodifluoromethane ($CCl_2F_2$), B.P. $-21.6°$ F., and monochlorofluoromethane ($CH_2ClF$), B.P. $15.5°$ F., in certain proportions form an azeotropic mixture and essentially azeotropic mixtures all of which mixtures boil at a temperature lower than the minimum boiling $CCl_2F_2$ component ($-21.6°$ F./1 atm.).

At 126 p.s.i.a., the true azeotropic mixture of the invention consists of about 88 weight percent $CCl_2F_2$, about 12 weight percent of $CH_2ClF$ and boils at a temperature of about $95°$ F. The true azeotropic composition will, of course vary with the pressure. The essentially azeotropic mixtures possess boiling points and vapor pressures which are close to those of the true azeotropic mixture and which are lower and higher respectively than the corresponding properties of either of the azeotropic components. It can be seen, therefore, that the essentially azeotropic mixtures behave similarly as refrigerants to the true azeotropic mixture. Accordingly, the essentially azeotropic mixtures and the true azeotropic mixture will hereinafter be referred to generically as "the azeotropic mixtures."

The azeotropic mixtures exhibit a number of desired properties for refrigeration purposes such as higher refrigerating capacities than either of the components, negligible flammability, low toxicity and others. A highly unexpected property of the azeotropic mixtures found was that increased refrigeration capacity of the azeotropic mixtures is obtained as compared with either of its components with no substantial increase in vapor pressure. This is significant because it means that higher capacities can be realized with such mixtures as compared with $CCl_2F_2$ alone, without disadvantageous increase in operating pressure.

The novel azeotropic mixtures are particularly useful in centrifugal refrigeration systems and in refrigeration systems having high condensing temperatures such as automobile air conditioning systems.

A preferred class of the subject azeotropic mixtures are those which possess vapor pressures at 95° F. which are within about 3.5 p.s.i.a. of the vapor pressure of the true azeotrope at this temperature (about 126.4 p.s.i.a.). These mixtures contain between about 1–25 weight percent $CH_2ClF$ based on the total weight of the mixture. All these mixtures boil below the boiling point of the $CCl_2F_2$ component. More preferred are those azeotropic mixtures which contain smaller variations in the $CH_2ClF$ content such as 5–19 weight percent $CH_2ClF$ and still preferred, 10–14 weight percent $CH_2ClF$.

The azeotropic mixtures of the invention may be employed to porduce refrigeration in a conventional manner by condensing the mixtures and thereafter evaporating said mixtures in the vicinity of a body to be cooled.

The azeotropic mixtures of the invention may also be employed for other applications such as for aerosol propellants, power cycle fluids, gaseous dielectric, heat transfer media and low temperature solvents.

EXAMPLE 1

Approximately equal molar proportions of $CCl_2F_2$ and $CH_2ClF$ were refluxed in a low temperature still at 14.65 p.s.i.a. Reflux temperature was −22.7° F., which is below the boiling point of either $CCl_2F_2$ (B.P. −21.6° F.) or $CH_2ClF$ (B.P. 15.5° F.) indicating the formation of a minimum boiling azeotrope. The portion of the material distilling at −22.7° F. was collected; the remainder of the material in the still was discarded; the still was recharged with the collected sample and the sample was again refluxed. The refluing temperature was unchanged at −22.7° F. indicating that the azeotropic composition was reached. At 126 p.s.i.a. the azeotrope was determined to consist of about 12 weight percent $CH_2ClF$ and 88 weight percent $CCl_2F_2$.

An evaluation of the refrigeration properties of the true azeotrope as compared with the properties of its components was made and the results are shown in Example 2 as follows.

EXAMPLE 2

The vapor pressure of the true azeotrope of the invention was compared with the vapor pressure of $CCl_2F_2$, the component with the highest vapor pressure. The results are shown in the following table:

TABLE I

| Temperature ° F. | Pressure p.s.i.a. | |
|---|---|---|
| | $CCl_2F_2$ | $CCl_2F_2/CH_2ClF$ azeotrope |
| −20 | 15.27 | 15.66 |
| 0 | 23.85 | 14.34 |
| 20 | 35.74 | 36.40 |
| 40 | 51.67 | 52.63 |
| 60 | 72.43 | 73.89 |

These data show that the vapor pressure of the azeotrope of the invention at different temperatures is higher than the corresponding vapor pressure of $CCl_2F_2$, the highest vapor pressure component. As can be seen, the increase in vapor pressure over $CCl_2F_2$ is relatively small. Based on the vapor pressure at −20° F., for example, it would be predicted that the azeotrope would exhibit a capacity increase of less than about 2.6% over $CCl_2F_2$. This prediction is based on the well-known fact that the capacity increase of one refrigerant over another is directly proportional to their vapor pressure at a given evaporator temperature $$\text{at} -20° \text{F.}, \frac{15.66-15.27}{15.27}).$$

EXAMPLE 3

Refrigeration capacities of the true azeotrope of the invention as compared with the highest capacity component, viz. $CCl_2F_2$, were compared on the basis of actual machine tests. The equipment used was a 3 H.P. hermetic compressor with instrumentation to measure temperature, pressure and power inputs to the system. The comparative data are shown in Table II.

TABLE II

| | $CCl_2F_2$ | $CCl_2F_2/CH_2ClF$ Azeotrope |
|---|---|---|
| Evaporator temperature, ° F. | −20 | −20 |
| Condenser, temperature, ° F. | +100 | +100 |
| Capacity, B.t.u./cu. ft. | 6.09 | 6.98 |
| Relative capacity | 100% | 114.6% |

The actual machine tests on the performance of the azeotrope as compared with the performance of $CCl_2F_2$ alone, as reported in Table II, show that in practice the azeotrope exhibits a 14.6% increase in capacity over that of $CCl_2F_2$ alone, or almost six (6) times the capacity which would have been expected based upon the comparative vapor pressures as reported in Table I of Example 1.

We claim:
1. Mixtures of dichlorodifluoromethane and monochloromonofluoromethane in which the weight percent of monochloromonofluoromethane based on the total weight of the mixture is in the range of about 1 to 25.
2. Mixtures of dichlorodifluoromethane and monochloromonofluoromethane according to claim 1 in which mixtures the weight percent of monochloromonofluoromethane is in the range of about 5 to 19.
3. Mixtures of dichlorodifluoromethane and monochloromonofluoromethane according to claim 1 in which mixtures the weight percent of monochloromonofluoromethane is in the range of about 10–14.
4. A mixture of dichlorodifluoromethane and monochloromonofluoromethane according to claim 1 in which mixture the weight percent of monochloromonofluoromethane is about 12.
5. The process of producing refrigeration which comprises condensing a mixture as defined in claim 1 and thereafter evaporating said mixture in the vicinity of a body to be cooled.
6. The process according to claim 5 in which the mixture is as defined in claim 3.
7. The process according to claim 5 in which the mixture is as defined in claim 4.
8. The process according to claim 5 in which the mixture is as defined in claim 5.

References Cited

UNITED STATES PATENTS

| 1,968,050 | 7/1934 | Nudgley | 252—67 |
| 2,479,259 | 8/1949 | Reed | 252—67 |

FOREIGN PATENTS

| 668,609 | 8/1950 | Great Britain | 252—67 |

JOHN D. WELSH, Primary Examiner

U.S. Cl. X.R.

252—305; 62—114